United States Patent
Retzer et al.

(10) Patent No.: US 7,440,764 B2
(45) Date of Patent: Oct. 21, 2008

(54) METHOD AND APPARATUS FOR IMPROVING THROUGHPUT IN A WIRELESS LOCAL AREA NETWORK

(75) Inventors: Michael H. Retzer, Palatine, IL (US); Randy L. Ekl, Lake Zurich, IL (US); Joseph E. Phillips, Huntley, IL (US)

(73) Assignee: Motorola, Inc., Schaumburg, IL (US)

( * ) Notice: Subject to any disclaimer, the term of this patent is extended or adjusted under 35 U.S.C. 154(b) by 654 days.

(21) Appl. No.: 10/777,888

(22) Filed: Feb. 12, 2004

(65) Prior Publication Data

US 2005/0180381 A1 Aug. 18, 2005

(51) Int. Cl.
*H04Q 7/20* (2006.01)

(52) U.S. Cl. .................. 455/466; 455/422.1; 455/412.1

(58) Field of Classification Search ................. 455/403, 455/414.1, 422, 466, 433; 370/338, 474, 370/252, 242, 465, 397, 310, 331, 375, 395; 709/246, 227, 228
See application file for complete search history.

(56) References Cited

U.S. PATENT DOCUMENTS

| 5,453,987 | A | | 9/1995 | Tran |
|---|---|---|---|---|
| 5,912,921 | A | | 6/1999 | Warren et al. |
| 5,949,776 | A | * | 9/1999 | Mahany et al. .............. 370/338 |
| 5,958,018 | A | * | 9/1999 | Eng et al. .................... 709/246 |
| 6,031,833 | A | | 2/2000 | Fickes et al. |
| 6,674,738 | B1 | * | 1/2004 | Yildiz et al. ................. 370/338 |
| 6,744,753 | B2 | * | 6/2004 | Heinonen et al. ........... 370/338 |
| 2004/0120292 | A1 | * | 6/2004 | Trainin ....................... 370/338 |

* cited by examiner

*Primary Examiner*—Tony T Nguyen
(74) *Attorney, Agent, or Firm*—Latonia Gordon; Anthony P. Curtis

(57) ABSTRACT

A method and apparatus for improving throughput in a wireless local area (WLAN), which includes buffering a set of messages, identifying a target address for the set of messages, and concatenating the set of messages based on the target address.

The target address can be either unicast, broadcast, multicast or combination of unicast, broadcast and multicast as described herein.

8 Claims, 4 Drawing Sheets

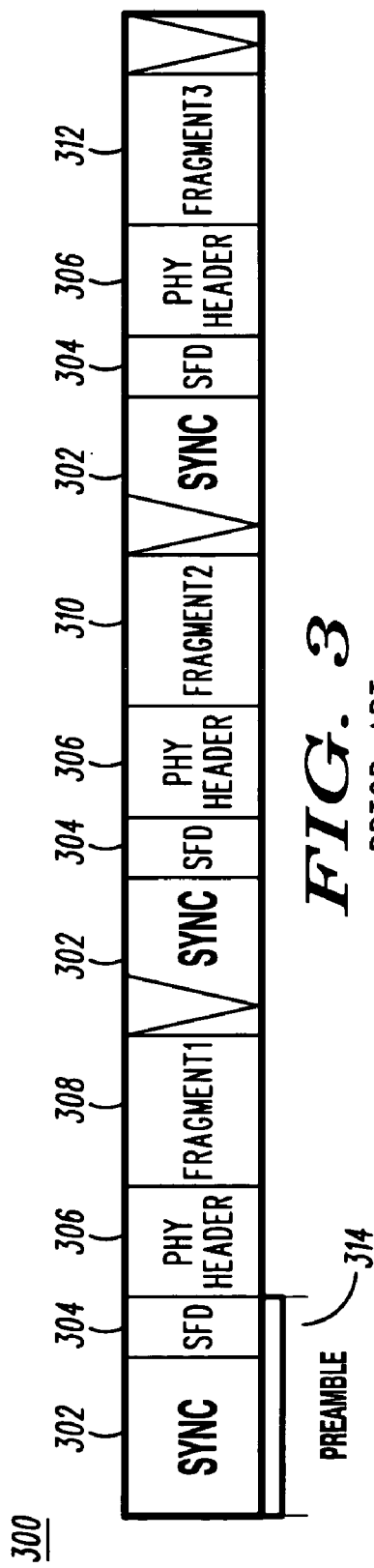
FIG. 3 —PRIOR ART—
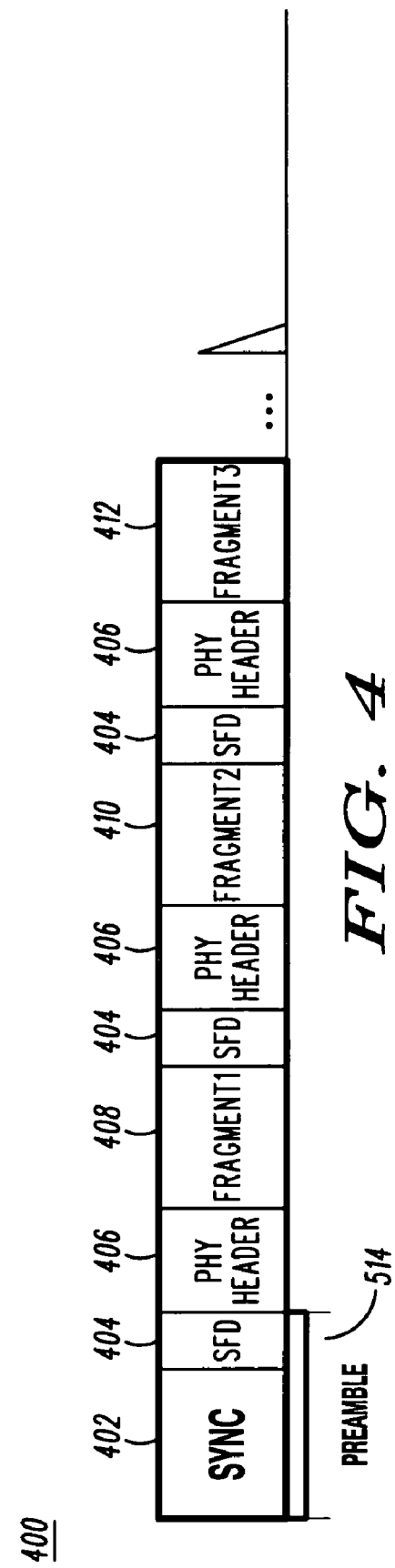
FIG. 4

METHOD AND APPARATUS FOR IMPROVING THROUGHPUT IN A WIRELESS LOCAL AREA NETWORK

FIELD OF THE INVENTION

This invention relates to wireless local area networks (WLANs), and more particularly to a method of improving throughput in a wireless network in a contention based environment.

BACKGROUND OF THE INVENTION

Many wireless systems 100, most notably 802.11 wireless local area network ("WLAN") systems, can operate in both an infrastructure mode and a peer-to-peer mode; in other words, as illustrated in FIG. 1, in an infrastructure mode, the mobile stations 102, 104 communicate with each other through the infrastructure device 106 (e.g., access point, base station, or the like), or the information can be communicated directly from mobile station-to-mobile station. The infrastructure device 106, also provides the connection to the wired LAN, depicted by circle 108, via the Ethernet bridge 110. It should be noted that the coverage area of the infrastructure device 106 is depicted by circle 112. It should be noted that WLANs protocols currently in use, such as variations on 802.11, evolved from the Ethernet wired protocols, where each participating mobile station contends equally for bandwidth resources.

As illustrated in FIG. 2, the partial OSI model 200 comprises the physical (PHY) layer 202 and the medium access control (MAC) layer 204. The PHY layer 202 and MAC layer 204 make up the bottom portion of the OSI model 200. The PHY layer 202 is the interface between the MAC layer 204 and the wireless media, which transmits and receives messages (typical referred to as "data frames" or data packets) over a shared wireless link. In 802.11 WLAN systems, the MAC protocol is the mechanism used to deliver reliable messages (e.g., Media Access Data Units, "MSDU's") over the wireless link. In order to ensure that the messages in 802.11 are reliably sent over the wireless link, the protocol requires that the MSDU be converted to MAC protocol data unit ("MPDU"), by adding a header and a trailer. Once the messages have been appropriately formatted, the message is then forwarded to the appropriate PHY layer to be sent over the wireless link. Since there are multiple PHY layers capable of communicating with the MAC layer, each PHY layer 202 is structured uniquely based on modulation type, to allow a mobile station to transmit and receive messages at a designated data rate. It should be noted that the MPDU is referred to as a PLCP protocol data unit ("PPDU") depending on the PHY layer type, however the format and the functions are essentially the same. It should also be noted that the PHY layer 202 is composed of physical layer convergence sublayer (PLCP) 206 and a physical medium dependent sublayer (PMD) 208.

As shown in FIG. 3, the basic format of the PHY layer 300 includes a preamble 314, a PHY header 306, and message depicted by $fragment_1$ 308, $fragment_2$ 310, and $fragment_3$ 312. The preamble consists of a SYNC field 302 and a start of frame delimiter (SFD) field 304. The mobile station uses the SYNC field to capture the incoming signal and to synchronize its receiver and the SFD field to indicate the start of the message. The SYNC field 302 also allows for ramping up and down the transmit power, establishing bit edge determination at the receiver of the mobile station, and an energy measurement interval for antenna diversity. Each preamble 300 is followed by a PHY header 306, the next $fragment_2$ 310. The cycle is repeated with Preamble 314, PHY header 306 and, $fragment_3$ 312 until the all fragments in the set are received.

In actual practice, many WLANs implementations utilize the infrastructure mode, with all mobiles stations communicating to a wired LAN 108 through the infrastructure device 106. Therefore, the majority of the traffic is "downlink" (e.g., messages flow over the wireless link from the fixed infrastructure device 106 to the mobile stations 102, 104).

A major disadvantage resulting from the manner in which the mobile stations 102, 104 communicate with each other when operating in the infrastructure mode is that the throughput on the air interface in increased, consuming twice the bandwidth.

Another disadvantage is that in applications, such as multimedia voice, individual messages are small such that functions performed by the SYNC field 302 (e.g., establishing bitsync headers and ramp up times, etc.) add significantly to the overhead. This is particularly impactful as the bitsync headers are sent at the slowest, least common denominator data rates available in order to support backward compatibility and derated performance.

Nevertheless, in the infrastructure mode, a mobile station 102, 104 is required to transmit to the infrastructure device 106 within the bounds of the existing protocols. Thus, there exists a need for a method to achieve greater throughput when operating in the infrastructure mode in a WLAN environment.

BRIEF DESCRIPTION OF THE FIGURES

A preferred embodiment of the invention is now described, by way of example only, with reference to the accompanying figures in which:

FIG. 3 (prior art) illustrates a timing diagram standard physical layer format in a WLAN system;

FIG. 4 illustrates a timing diagram of a concatenated physical layer format;

DETAILED DESCRIPTION OF THE PREFERRED EMBODIMENT

Figure 1:
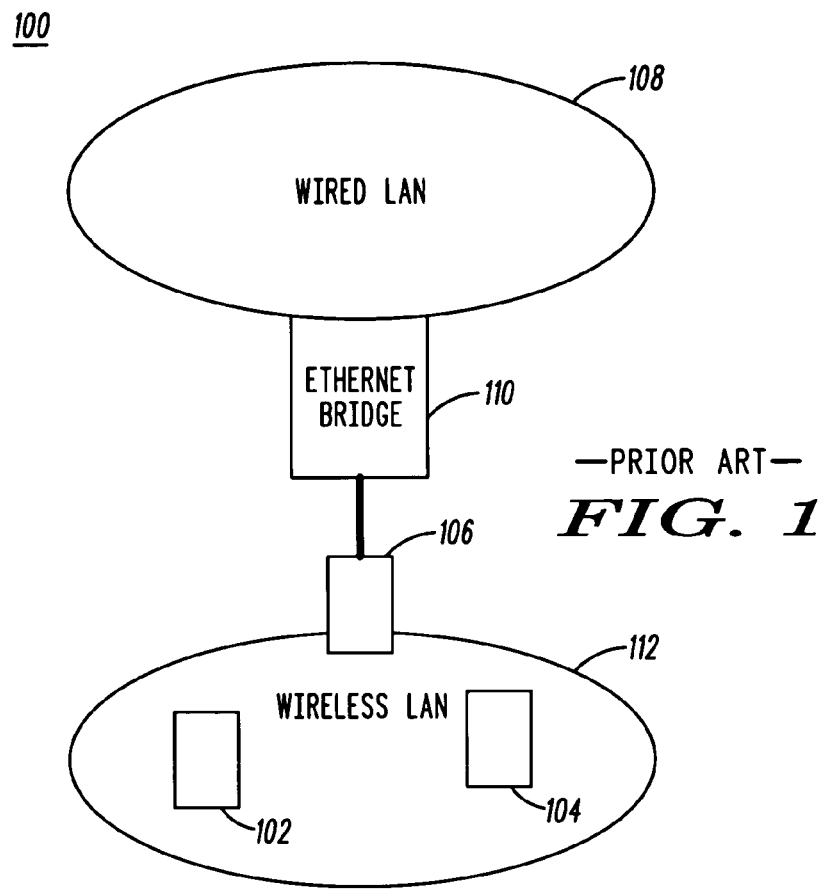
FIG. 1 (prior art) illustrates a plurality of mobile stations operating within range of an infrastructure device in a WLAN system.
Figure 2:
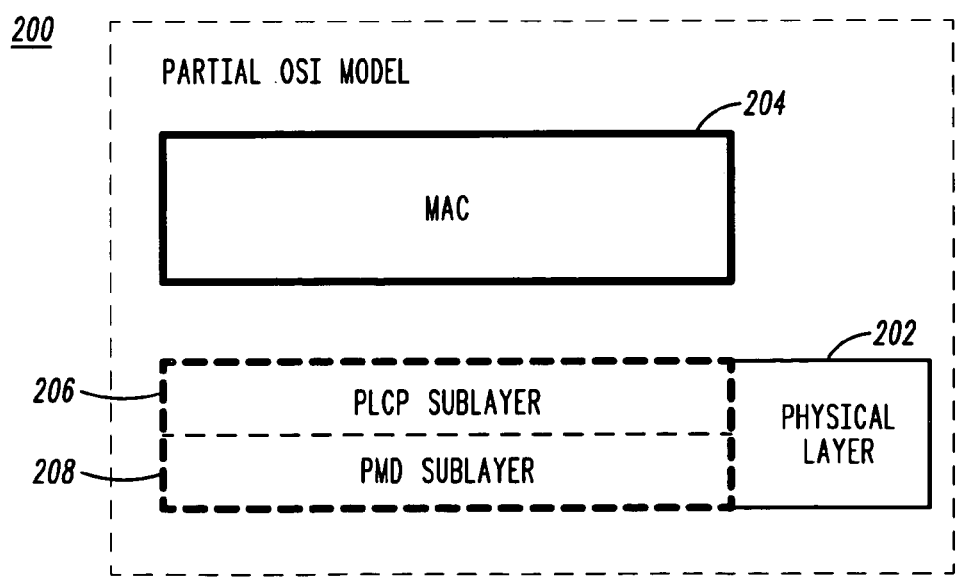
FIG. 2 (prior art) illustrates an interface between the PHY and MAC layer in a WLAN system.

The present invention provides a method for improving system messaging throughput in a WLAN, particularly wireless infrastructure-based networks. The present invention discloses a method in which the throughput performance of the network is improved by fragmenting a single message into a plurality of fragments and transmitting each fragment separately, wherein only one fragment of the message comprises the synchronization for the entire message. In other words, unlike the prior art depicted in FIG. 3, the SYNC field typically attached to and transmitted with each fragment of a message is eliminated from each fragment of the message except one. Optionally, other redundant signaling, such as the SFD field, may also be removed from the plurality of fragments in accordance with the present invention. The present invention further discloses a diversity receiver that eliminates the increased interference associated with concatenating long transmission streams at the receiver end when there is only a single SYNC field for entire message (e.g., multiple fragments). The diversity receiver utilizes separate receiver and demodulation paths to allow the diversity receiver to decode each fragment on both paths and choose the best path (i.e., the path with the least amount of interference) to recover the fragment. Let us now refer to FIGS. 4-6 to describe the present invention in greater detail. It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

FIG. 4 depicts the relative performance difference between the standard PHY layer format 300 in FIG. 3 (shadowed for comparison only) and a concatenated PHY layer format 400 in a WLAN system. As previously stated, the PHY layer 202 is the interface between the MAC layer 204 and the wireless media, which transmits and receives messages (e.g., "data frames") over a shared wireless link. Unlike wired LANs, WLAN systems must deal with significant interference problems. To deal with the interference issues, the MAC layer fragments its messages in order to increase the probability that a message is correctly received over the wireless media. A message is typically divided into one or more fragments (e.g., MPDUs or PPDUs) which is limited to a maximum value or threshold as defined by the IEEE 802.11 MAC specification. The fragments are transmitted in order by sequence with the lower number fragment (e.g. fragment$_1$ 408) being transmitted first. Subsequent fragments (e.g., fragment$_2$ 410, fragment$_3$ 412) are transmitted immediately after receiving verification (e.g., acknowledgements) that the previous fragment has been received. The SYNC field 402 contains a string of 1s that are scrambled prior to transmission. As previously mentioned, the SYNC field 402 is utilized by the receiver portion 550, 650 of the mobile station 102, 104 to acquire the incoming signal and synchronize each fragment prior to receiving the SFD, as depicted by the SFD field 404.

As noted above in the prior art depicted in FIG. 3, the SYNC field 302 precedes each fragment in the message (e.g. fragment$_1$ 308, fragment$_2$ 310, and fragment$_3$ 312). In the preferred embodiment of the present invention, however, the SYNC field 402 precedes only the first fragment (e.g., fragment$_1$ 408) and is not transmitted with or precedes the remaining fragments in the message. Thus, in operation, the transmitter of the present invention transmits the first fragment (i.e., fragment$_1$) 408 of the message along with a SYNC field 402, a SFD field 404, and a PHY header field 406. Since the preferred embodiment of the present invention transmits only a single SYNC field 402 to provide synchronization for the entire message, the remaining fragments of the message (i.e., fragment$_2$ and fragment$_3$) 410, 412 are transmitted along with only the SFD field 404 and PHY header field 406; no additional synchronization signaling is required.

Thus, fragment$_1$ 408, fragment$_2$ 410, and fragment$_3$ 412 are each concatenated at the receiver based on the target address (e.g., address of the mobile station 102,104) in accordance with the present invention. The target address can be unicast to a single address per message, broadcast to multiple addresses per message, multicast to multiple addresses per multiple messages or a combination of unicast, broadcast, and multicast, thus allowing multiple PHY headers 406 to be concatenated in one message.

It will be appreciated by those skilled in the art that this process continues until all fragments in the set 501 are received. It will also be appreciated by those skilled in the art that in an alternate embodiment, the throughput of the WLAN system can be further improved by eliminating the SFD field 404. In both embodiments, however, the shorter overall transmission time enabled by this concatenation technique significantly improves system throughput and decreases the amount of bandwidth consumed. As previously noted in application such as multimedia voice the functions performed by the SYNC field 402 (e.g. establishing the bitsync headers and ramp up times) add significantly to the overhead, therefore removal of the SYNC field 402 from subsequent fragments is particularly impactful as the bitsync headers are sent at the slowest, least common denominator data rates available in order to support backward compatibility and derated performance.

Figure 5:
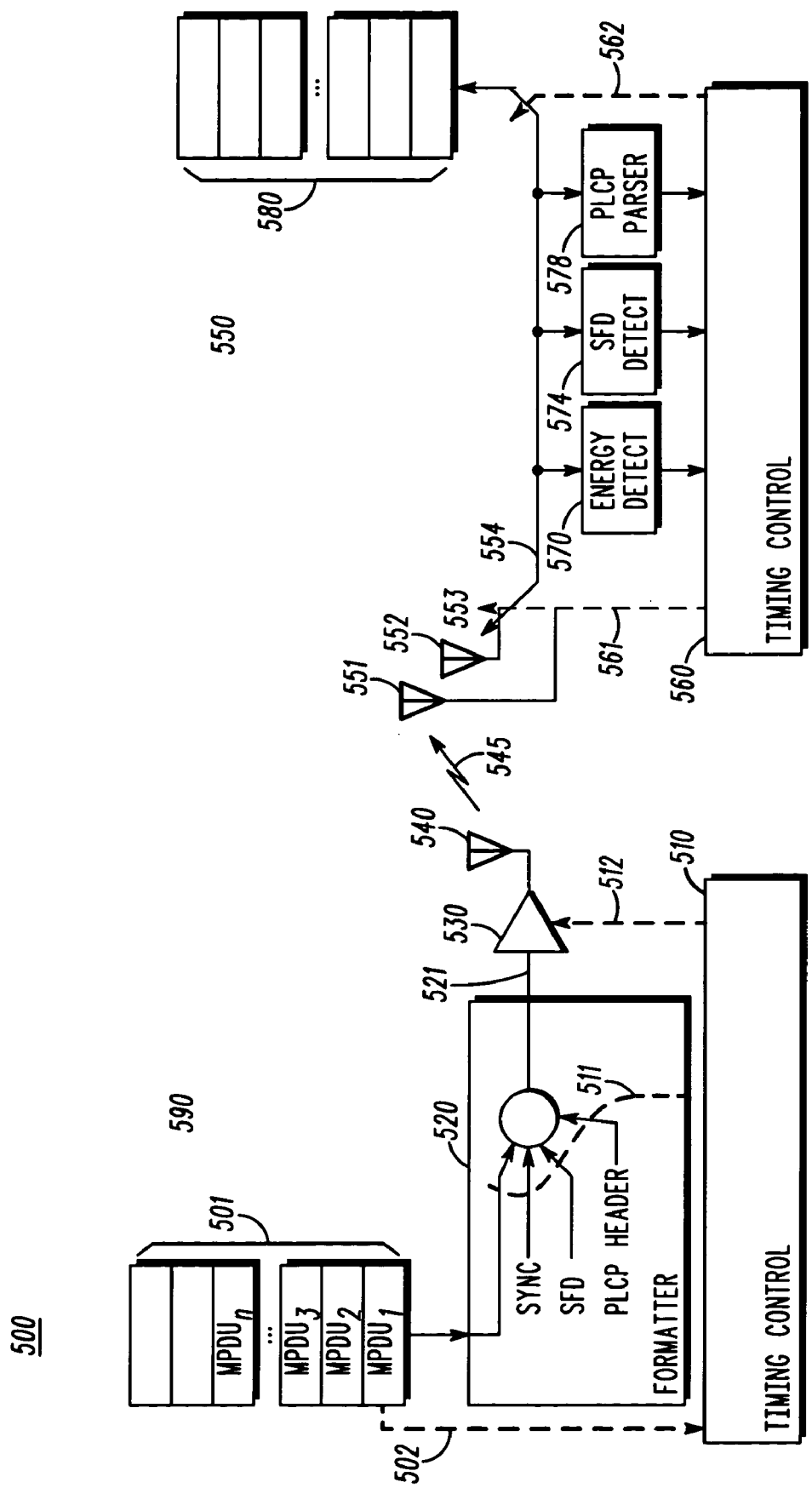
FIG. 5 illustrates a circuit diagram of a infrastructure device transmitting the concatenated messages to a mobile station utilizing diversity receiver for receiving an RF signal on a first receiver and demodulation path in a WLAN system.

FIG. 5 illustrates a circuit diagram 500 of an infrastructure device 590 transmitting the concatenated messages to the mobile station 102, 104 utilizing a diversity receiver for receiving an RF signal on a first receiver and demodulation path in a WLAN system.

When data packets become available for transmission in the transmit message queue (e.g., message set 501), the timing control unit 510 is signaled 502 starting the transmission burst event. The Timing Control unit 510 signals the RF transmitting circuitry 530 via output signal 512 to ramp up RF power. Then the Timing Control unit 510 combines the sequence signals 511 in the Formatter 520. The formatter 520 presents the information in the SYNC field 402, SFD field 404, PHY Header field 406, and fragement$_1$ 408 to the RF transmit circuitry 530 via output signal 521. The modulated RF waveform from the RF transmit circuitry 530 is transmitted from transmit antenna 540, over radio link 545. As previously stated, in this invention, once a data packet is transmitted, if there are remaining fragments in queue, the Timing Control unit 510 will recycle and transmit the next set of information in the SFD field 404, PHY Header field 406, and the next fragment$_2$ 410. As shown in this embodiment of the invention, the recycling of the information in the SFD field 404 and PHY Header 406 is repeated and the next fragment$_3$ 412 is sent. The Timing control unit 510 will continue to do this until the final fragment$_n$ in the message set 501 has been sent. When the queue is empty or some other event occurs forcing the transmitter to stop, the Timing Control unit 510 will signal the RF transmitting circuitry 530 to shut down.

The resulting RF waveform is received at one or more receiving antennas 551,552 and associated RF receiver amplification, filtering, and demodulation circuitry, and presented to energy detector 570 via RF signal 554. This energy detector 570 determines a quantitative measure of received signal energy, and presents this measure to receive Timing Control unit 560. As the RF waveform first begins to appear at the receiving antennas 551, 552, the energy measure causes the Timing Control unit 560 to apply signal 561 to switch 553, in order to maximize the received RF energy by toggling between receiving antennas 551 and 552. This measurement is nominally made during the first few instants of the received waveform, normally during the SYNC interval.

The receiver demodulation circuitry of the receiver portion 550, 650 of the mobile station 102, 104 will begin to recover bit synchronization, and make received bit estimations. These estimations are passed to the SFD 574, the PHY PHY Parser 578 can then extract its information fields, one of which indicates the length of the following data packet. The Timing Control unit 560 uses this length to extract the next fragment, and store it in the receive buffer 580 via control 562. In this invention, once a data packet has been buffered (e.g. fragmented), the Timing Control unit 560 will recycle and again begin observing the output of the SFD 574 in anticipation of the next fragment. Should a subsequent SFD 574 not be detected, the Timing Control unit 560 will return to observing the Energy detector 570.

Figure 6:
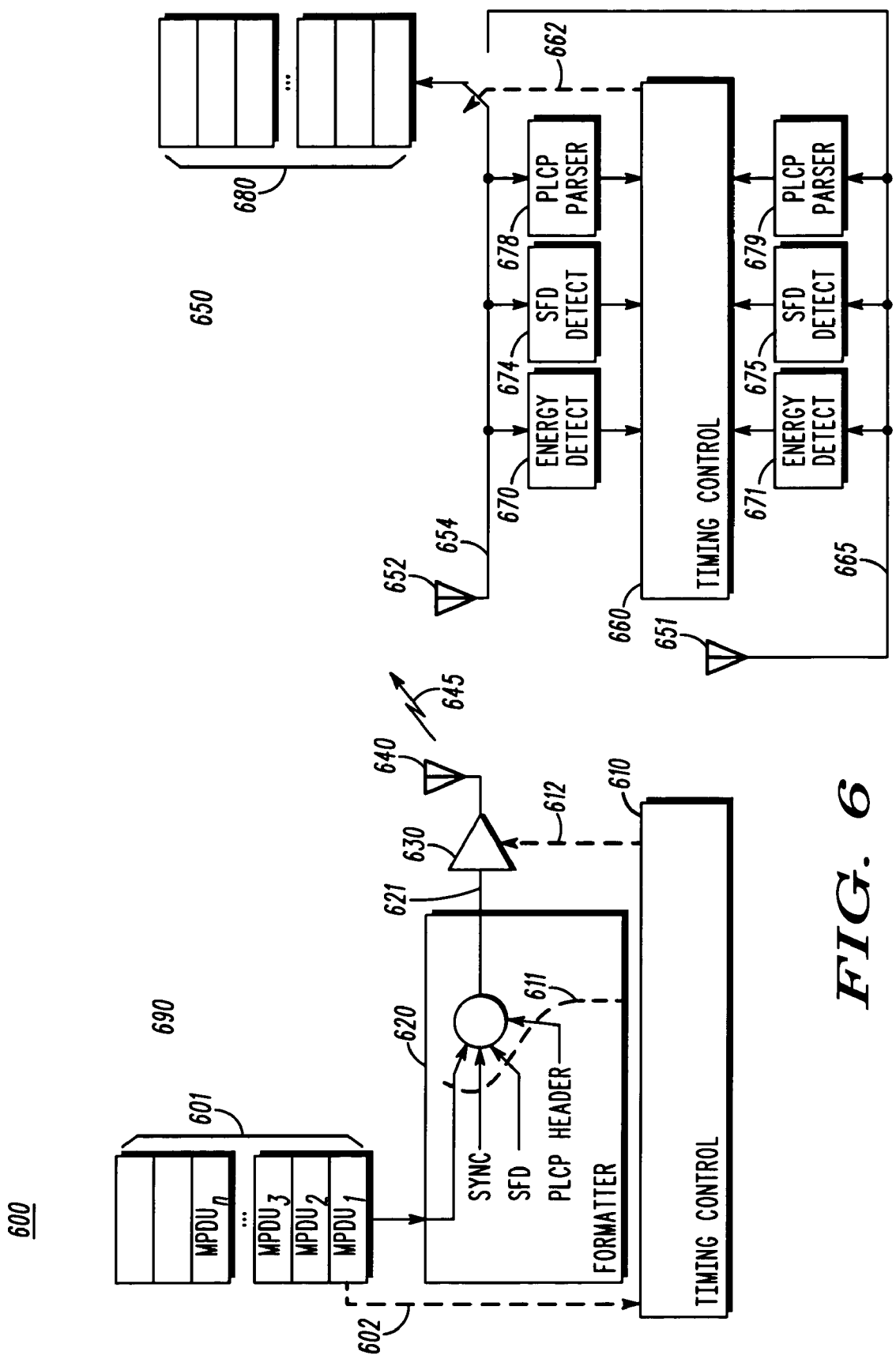
FIG. 6 illustrates a circuit diagram of a infrastructure device transmitting to a mobile station utilizing a diversity receiver for receiving an RF signal on a first receiver and demodulation path and a second receiver and demodulation path in a WLAN system.

FIG. 6 illustrates a circuit diagram 600 of an infrastructure device 690 transmitting to a mobile station 102, 104 utilizing a diversity receiver 550, 650 for receiving an RF signal on a first receiver and demodulation path and a second receiver and demodulation path in a WLAN system.

A potential difficulty with concatenating long transmission streams by eliminating SYNC intervals from separate messages is that in typical operation a receiver portion of the mobile station 650 will use the re-occurring SYNC intervals to check the antenna diversity decision. With the typically high carrier frequencies used in WLAN data systems, (2 to 5 GHz), signal conditions due to multipath and fading may change appreciably between the SYNC occurrence (in FIG. 5) and some subsequent fragment$_n$.

The improved embodiment of FIG. 6 nullifies problems associated with increased interference due to multipath and fading by employing a separate receiver and demodulation path 655 for the diversity antenna 651. This separate receiver and demodulation path comprises its own Energy Detector 671, SFD Detector 675, and PLCP parser 679. Each path 654 and 655 continuously attempts to decode the incoming RF waveform, with one or the other paths receiving the better diversity signal at any given instant. The Timing and Control unit 660 via 662 continuously chooses the best path to recover the received fragments based on the continuous energy detection of both energy detectors 670, 671, success of the SFD CRC check, or other criteria.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method for improving throughput in a wireless local area (WLAN), the method comprising the steps of:
   buffering a set of messages;
   identifying a target address for the set of messages; and
   concatenating the set of messages based on the target address,
   wherein the step of concatenating further comprises the steps of:
   (a) eliminating a sync interval;
   (b) preserving a message header;
   (c) transmitting a subsequent message;
   (d) transmitting the message header; and
   (e) repeating steps (a) through (d), until a last subsequent message in the set of messages have been sent.

2. The method of claim 1 wherein the step of preserving further comprises the step of preserving a start of frame delimiter (SFD) and transmitting the SFD.

3. The method of claim 1 wherein the message is identified as a MAC protocol data unit (MPDU) type message.

4. The method of claim 1 wherein the message is identified as a PLCP protocol data unit (PPDU) type message.

5. The method of claim 1 wherein the step of concatenating based on the target address comprises identifying the target address as an unicast type address.

6. The method of claim 1 wherein the step of concatenating based on the target address comprises identifying the target address as a broadcast type address.

7. The method of claim 1 wherein the step of concatenating based on the target address comprises identifying the target address as a multicast type address.

8. The method of claim 1 wherein the step of concatenating based on the target address comprises identifying the target address as an unicast type address, a broadcast type address and a multicast type address.

* * * * *

UNITED STATES PATENT AND TRADEMARK OFFICE
CERTIFICATE OF CORRECTION

PATENT NO. : 7,440,764 B2
APPLICATION NO. : 10/777888
DATED : October 21, 2008
INVENTOR(S) : Retzer et al.

Page 1 of 1

It is certified that error appears in the above-identified patent and that said Letters Patent is hereby corrected as shown below:

ON THE TITLE PAGE

1. On the Title Page, in Field (57), under "ABSTRACT", in Column 2, Line 2, after "area" insert --network--.

IN THE CLAIMS

2. In Column 6, Line 9, in Claim 1, after "area" insert --network--.

3. In Column 6, Line 14, in Claim 1, after "concatenating" delete --further--.

Signed and Sealed this

Eleventh Day of August, 2009

David J. Kappos
*Director of the United States Patent and Trademark Office*